(12) United States Patent
Moore

(10) Patent No.: US 6,864,312 B2
(45) Date of Patent: Mar. 8, 2005

(54) AQUEOUS POLYURETHANE DISPERSIONS USEFUL FOR PREPARING POLYMERS WITH IMPROVED MOISTURE RESISTANCE PROPERTIES

(75) Inventor: Douglas R. Moore, Clute, TX (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 10/324,378

(22) Filed: Dec. 19, 2002

(65) Prior Publication Data

US 2003/0087567 A1 May 8, 2003

Related U.S. Application Data

(62) Division of application No. 09/453,700, filed on Dec. 3, 1999, now Pat. No. 6,524,978.
(60) Provisional application No. 60/112,702, filed on Dec. 18, 1998.

(51) Int. Cl.$^7$ .............................. C08J 3/00; C08K 3/20; C08L 75/00
(52) U.S. Cl. ..................... 524/591; 425/839; 425/840
(58) Field of Search ..................... 524/425, 591, 524/839, 840

(56) References Cited

U.S. PATENT DOCUMENTS

| | | | |
|---|---|---|---|
| 3,437,624 A | 4/1969 | Dawn et al. | 260/29.2 |
| 3,730,822 A | 5/1973 | Lovell et al. | 161/66 |
| 3,755,212 A | 8/1973 | Dunlap et al. | 260/2.5 BD |
| 3,772,224 A | 11/1973 | Marlin et al. | 260/2.5 BD |
| 3,821,130 A | 6/1974 | Barron et al. | 260/2.5 BD |
| 3,862,879 A | 1/1975 | Barron et al. | 161/159 |
| 3,971,764 A | 7/1976 | Schürmann et al. | 260/77.5 AM |
| 4,022,941 A | 5/1977 | Prokai et al. | 427/358 |
| 4,035,529 A | 7/1977 | Meisert et al. | 427/244 |
| 4,066,591 A * | 1/1978 | Scriven et al. | 524/840 |
| 4,092,286 A | 5/1978 | Noll et al. | 260/29.2 TN |
| 4,096,127 A | 6/1978 | Schurmann et al. | 260/77.5 AM |
| 4,112,161 A | 9/1978 | Sorells | 428/95 |
| 4,171,395 A | 10/1979 | Tillotson | 428/95 |
| 4,237,264 A | 12/1980 | Noll et al. | 528/67 |
| 4,241,131 A | 12/1980 | Bailey | 428/262 |
| 4,278,482 A | 7/1981 | Poteet et al. | 156/78 |
| 4,286,003 A | 8/1981 | Higgins et al. | 428/95 |
| 4,296,159 A | 10/1981 | Jenkines et al. | 428/95 |
| 4,336,089 A | 6/1982 | Asperger | 156/152 |
| 4,405,393 A | 9/1983 | Tillotson | 156/78 |
| 4,483,894 A | 11/1984 | Porter et al. | 428/95 |
| 4,512,831 A | 4/1985 | Tillotson | 156/78 |
| 4,515,646 A | 5/1985 | Walker et al. | 156/78 |
| 4,611,044 A | 9/1986 | Meyer et al. | 528/56 |
| 4,619,853 A | 10/1986 | Blyth et al. | 428/95 |
| 4,643,930 A | 2/1987 | Ucci | 428/96 |
| 4,657,790 A | 4/1987 | Wing et al. | 427/374.1 |
| 4,696,849 A | 9/1987 | Mobley et al. | 428/95 |
| 4,742,095 A | 5/1988 | Markusch et al. | 523/322 |
| 4,775,558 A | 10/1988 | Haas et al. | 427/373 |
| 4,777,224 A | 10/1988 | Gorzynski et al. | 525/454 |
| 4,845,133 A | 7/1989 | Priester, Jr. et al. | 521/167 |
| 4,853,054 A | 8/1989 | Turner et al. | 156/78 |
| 4,853,280 A | 8/1989 | Poteet | 428/286 |
| 4,857,565 A | 8/1989 | Henning et al. | 523/343 |
| 4,879,322 A | 11/1989 | Markusch et al. | 523/322 |
| 4,913,958 A | 4/1990 | Skaggs et al. | 428/318.6 |
| 5,037,864 A | 8/1991 | Anand et al. | 523/348 |
| 5,104,693 A | 4/1992 | Jenkines | 427/244 |
| 5,115,013 A | 5/1992 | Röttger et al. | 524/457 |
| 5,221,710 A | 6/1993 | Markusch et al. | 524/591 |
| 5,348,785 A | 9/1994 | Vinod | 428/95 |
| 5,401,553 A | 3/1995 | Miwa et al. | 428/94 |
| 5,417,723 A | 5/1995 | Träubel et al. | 8/94.21 |
| 5,422,186 A | 6/1995 | Biggeleben et al. | 428/423.3 |
| 5,486,398 A | 1/1996 | Weber et al. | 428/95 |
| 5,508,370 A | 4/1996 | Reiff et al. | 528/45 |
| 5,539,021 A | 7/1996 | Pate et al. | 523/335 |
| 5,558,916 A | 9/1996 | Heim et al. | 428/95 |
| 5,595,436 A | 1/1997 | Way, Jr. et al. | 362/190 |
| 5,712,342 A | 1/1998 | Kim et al. | 524/591 |
| 5,763,040 A | 6/1998 | Murphy et al. | 428/96 |
| 5,908,701 A | 6/1999 | Jennings et al. | 428/423.1 |

FOREIGN PATENT DOCUMENTS

| | | |
|---|---|---|
| EP | 0 435 542 A2 | 7/1989 |
| EP | 0 347 206 A1 | 12/1989 |
| FR | 2 388 848 | 11/1978 |
| WO | WO 96/27625 | 9/1996 |
| WO | WO 97/45395 | 12/1997 |
| WO | WO 98/09807 | 3/1998 |
| WO | WO 98/12273 | 3/1998 |

OTHER PUBLICATIONS

R.P. Brentin, "Latex Coating Systems for Carpet Backing", *Journal of Coated Fabrics*, vol. 12, pp. 82–91, (Oct. 1982).
P.L. Fitzgerald, "Integral Latex Foam Carpet Cushioning", *Journal of Coated Fabrics*, vol. 7, pp. 107–120, (Oct. 1977).
Buist, et al., "The properties of Polyurethanes and their applications", pp. 13–27, (Feb. 1959).
Japanese Abstract No. 0 9279482.

* cited by examiner

*Primary Examiner*—Patrick D. Niland

(57) ABSTRACT

The present invention is a polyurethane dispersion that can be used to prepare polyurethane polymers which have moisture resistant properties. Moisture resistant polymers of the present invention are obtained by preparing the polymers from a polyurethane dispersion using a prepolymer formulation which includes an aliphatic mono, di or polyhydroxy compound which has an aliphatic side chain substituent which contains from 5 to 30 carbon atoms.

14 Claims, No Drawings

AQUEOUS POLYURETHANE DISPERSIONS USEFUL FOR PREPARING POLYMERS WITH IMPROVED MOISTURE RESISTANCE PROPERTIES

CROSS REFERENCE STATEMENT

This application is a Divisional of prior application Ser. No. 09/453,700 filed on Dec. 3, 1999, now U.S. Pat. No. 6,524,978.

This application claims the benefit from U.S. Provisional Application No. 60/112,702 filed Dec. 18, 1998.

BACKGROUND OF THE INVENTION

This invention relates to polyurethane polymers. This invention particularly relates to polyurethane polymers obtained from aqueous polyurethane dispersions.

Polyurethane dispersions are known, and can be used to obtain polyurethane polymers that can themselves be useful in various applications. Polyurethane/urea dispersions can be used to obtain, for example: carpet backings; coatings for wood finishing; glass fiber sizing; textiles; adhesives; automotive topcoats and primers; films for packaging; gloves, and other applications. Polyurethane dispersions can be prepared by various processes, including, for example, those described in: U.S. Pat. No. 4,857,565; U.S. Pat. No. 4,742,095; U.S. Pat. No. 4,879,322; U.S. Pat. No. 3,437,624; U.S. Pat. No. 5,037,864; U.S. Pat. No. 5,221,710; U.S. Pat. No. 4,237,264; and, U.S. Pat. No. 4,092,286.

Polyurethane dispersions can be obtained according to a process that is described in U.S. application Ser. No. 09/039978. Dispersions prepared according to the process described therein can be useful for obtaining polyurethane carpet backings and polyurethane textile backings. Problems can result, however, in the event that a spill occurs wherein a liquid can flow onto, or be absorbed by, the backing on the underside of a carpet. Spilled liquids such as water, urine, beverage drinks, food, blood, and feces can penetrate a carpet backing to the underside of the carpet, which can be inaccessible to various cleaning methods. Polymeric materials having moisture resistance can be useful in protective wear such as gloves, for example, or packaging.

Various conventional methods can provide a moisture barrier to polymers obtained from aqueous polymeric dispersions. For example, increased coating weights of a dispersion can be used, thereby increasing the thickness of the polymer. Alternatively, wax added to an aqueous polymeric dispersion can provide a moisture barrier to carpet. Another known method for providing a moisture barrier is to decrease the amount of filler used in a carpet backing formulation. A non-permeable fabric or film can also be applied to a carpet backing, as described in U.S. Pat. No. 5,763,040. Still another method involves applying a fluorochemical on the underside of a secondary backing, and is described in U.S. Pat. No. 5,348,785. Use of fluorochemicals to impart water impermeability is also described in U.S. Pat. Nos. 4,619,853 and 4,643,930. A water-impervious film is described in U.S. Pat. No. 4,336,089. Application of various hydrophobic compositions to a secondary backing is described in U.S. Pat. No. 5,558,916.

It would be desirable in the art of preparing polyurethane polymers, to prepare a polyurethane dispersion that includes a component that imparts a moisture barrier to a polyurethane polymer, without adding complexity to a manufacturing process, or significantly changing the other properties of the polyurethane polymer. It would also be desirable in the art to prepare such a polymer by a process that would not significantly increase the cost of manufacture of the polymer, or articles produced therefrom.

SUMMARY OF THE INVENTION

In one aspect, the present invention is an aqueous polyurethane dispersion comprising an isocyanate terminated prepolymer prepared from a formulation including a polyisocyanate and a polyol mixture, wherein the polyol mixture includes at least one aliphatic mono, di or polyhydroxy compound which has an aliphatic side chain substituent which contains from 5 to 30 carbon atoms and wherein the aliphatic mono, di or polyhydroxy compound which has an aliphatic side chain substituent is present at a concentration of from 0.5 to 10 weight percent of the polymer.

In another aspect, the present invention is a moisture resistant polyurethane polymer comprising a polymer layer prepared by applying a layer of an aqueous polyurethane dispersion comprising an isocyanate terminated prepolymer prepared from a formulation including a polyisocyanate and a polyol mixture, wherein the polyol mixture includes at least one aliphatic mono, di or polyhydroxy compound which has an aliphatic side chain substituent which contains from 5 to 30 carbon atoms and wherein the aliphatic mono, di or polyhydroxy compound which has an aliphatic side chain substituent is present at a concentration of from 0.5 to 10 weight percent of the polymer to a substrate and allowing the dispersion to cure.

In still another aspect, the present invention is a moisture resistant textile comprising a textile and adherent thereto a polymer prepared by applying a layer of an aqueous polyurethane dispersion comprising an isocyanate terminated prepolymer prepared from a formulation including a polyisocyanate and a polyol mixture, wherein the polyol mixture includes at least one aliphatic mono, di or polyhydroxy compound which has an aliphatic side chain substituent which contains from 5 to 30 carbon atoms and wherein the aliphatic mono, di or polyhydroxy compound which has an aliphatic side chain substituent is present at a concentration of from 0.5 to 10 weight percent of the polymer to the textile and allowing the dispersion to cure.

Moisture resistant polyurethane of the present invention can be useful in cushioned flooring applications such as attached cushion broadloom, carpet tiles, carpet underlay, or vinyl flooring; adhesives applications; coatings; protective clothing or protective gear such as gloves and aprons; packaging; or any application where moisture resistant polymers can be useful.

DESCRIPTION OF THE PREFERRED EMBODIMENTS

In one embodiment, the present invention is an aqueous polyurethane dispersion composition that can yield a coating or a foam having good moisture resistance. A polyurethane dispersion of the present invention includes water, and either: a polyurethane; a mixture capable of forming a polyurethane; or a mixture of both. A polyurethane dispersion of the present invention can optionally include: chain extenders; surfactants; fillers; dispersants; foam stabilizers; thickeners; fire retardants, and/or other optional materials that can be useful in a polyurethane formulation.

The polyisocyanate component of the formulations of the present invention can be prepared using any organic polyisocyanates, modified polyisocyanates, isocyanate-based prepolymers, and mixtures thereof. These can include aliphatic and cycloaliphatic isocyanates, but aromatic and especially multifunctional aromatic isocyanates such as 2,4- and 2,6-toluenediisocyanate and the corresponding isomeric mixtures; 4,4'-, 2,4'- and 2,2'-diphenyl-methanediisocyanate (MDI) and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates are preferred. Most preferably, the polyisocyanate used to prepare the prepolymer formulation of the present invention is MDI or PMDI.

A polyurethane dispersion of the present invention is an aqueous dispersion of a polyurethane and/or polyurethane-forming materials. For the purposes of the present invention, polyurethane dispersions can include other polymeric and/or oligomeric compounds including, but not limited to: ureas, biurets, allophonates, and other compounds having functionality that can be derived from the reaction of an isocyanate with the various active hydrogen containing compounds present in the formulation. Polyurethane-forming materials, as the term is used in the present invention, are materials which are capable of forming polyurethane polymers. Polyurethane-forming materials include, for example, polyurethane prepolymers. Prepolymers useful in the practice of the present invention can be prepared by reacting active hydrogen-containing compounds with an amount of isocyanate in excess of the active hydrogen functionality present in the reaction mixture. The isocyanate functionality can be present in an amount of from about 0.2 wt. percent to about 40 wt. percent of the dispersion. A suitable prepolymer can have a molecular weight in the range of from about 100 to about 10,000.

Prepolymers useful in the practice of the present invention should be substantially liquid under the conditions of dispersal. While it is possible to add a liquid solvent or diluent such as a volatile organic compound (VOC) to the prepolymer to obtain a more fluid prepolymer, it is preferred in this invention to utilize no solvent or diluent, as the removal of these ingredients require extra processing steps and possible environmental consequences from the use of these VOCs. Preferably, the polyurethane dispersions of the present invention are prepared in the substantial absence of an organic solvent.

Active hydrogen compounds are compounds having functional groups that contain at least one hydrogen atom bonded directly to an electronegative atom such as nitrogen, oxygen or sulfur. Various types of active hydrogen compounds, such as amines, alcohols, polyether polyols, polyester polyols, and mercaptans, for example, are known to those skilled in the art of preparing polyurethane polymers. Active hydrogen compounds suitable for use in the practice of the present invention can be polyols having molecular weights of less than about 10,000.

The aliphatic substituted hydroxy functional compound employed in the invention can consist of any compound possessing an aliphatic substituent of from 1 to 30 carbon atoms and one or more hydroxyl groups. Examples of such compounds include glycols such as glycerin, trimethylolpropane, or trimethylolethane which are partially esterified with a 1 to 30 carbon carboxylic acid, preferably a 5 to 22 carbon carboxylic acid, and more preferably a 10 to 15 carbon carboxylic acid. Examples of these compounds include the group consisting of glycerol monooleate, glycerol monobehenate, glycerol monotallate, glycerol monostearate, glycerol monopalmitate, trimethylolpropane monostearate, and mixtures thereof. Other types of compounds include polymeric versions of the aforementioned compounds, and copolymers of these compounds with other glycols, diols and acids or anhydrides. In addition, the aliphatic substituent may be attached to the hydroxyl portion of the compound via heteroatoms such as oxygen or nitrogen, such compounds include the N,N-bis (hydroxyalkyl) alkylamines, one example of which is N-stearyl diethanolamine. Branched chain hydroxy alkanes such as 1,2-dihydroxyoctadecane may also be used. Additionally sorbitan based esters such as the group consisting of sorbitan monostearate, sorbitan monooleate, sorbitan monolaurate, sorbitan monooleate, and mixtures thereof may also be used. Of these, the glycerol monoesters are preferred.

The aliphatic substituted hydroxy functional compound employed in the present invention can be used in a suprizingly low concentration to prepare polymers which are effective at repelling moisture. Preferably, the aliphatic substituted hydroxy functional compounds are present at a concentration of from 0.5 to 10 percent of the polymer weight of a polyurethane dispersion. More preferably, the aliphatic substituted hydroxy functional compounds are present at a concentration of from 1.0 to 4.5 percent of the polymer weight of a polyurethane dispersion and even more preferably, the aliphatic substituted hydroxy functional compounds are present at a concentration of from 1.5 to 2.5 percent of th polymer weight of a polyurethane dispersion.

Other types of aqueous polymeric dispersions can be used in combination with the polyurethane dispersions of the present invention. Suitable dispersions useful for blending with polyurethane dispersions of the present invention include: styrene-butadiene dispersions; styrene-butadiene-vinylidene chloride dispersions; styrene-alkyl acrylate dispersions; or acrylic dispersions; like compounds and mixtures thereof.

The present invention optionally includes a chain extender or a crosslinker. A chain extender is used herein to build the molecular weight of the polyurethane prepolymer by reaction of the chain extender with the isocyanate functionality in the polyurethane prepolymer, i.e., chain extend the polyurethane prepolymer. A suitable chain extender or crosslinker is typically a low equivalent weight active hydrogen containing compound having about 2 or more active hydrogen groups per molecule. Chain extenders typically have 2 or more active hydrogen groups while crosslinkers have 3 or more active hydrogen groups. The active hydrogen groups can be hydroxyl, mercaptyl, or amino groups. An amine chain extender can be blocked, encapsulated, or otherwise rendered less reactive. Other materials, particularly water, can function to extend chain length and, therefore, can be chain extenders for purposes of the present invention.

Polyamines are preferred chain extenders. It is particularly preferred that the chain extender be selected from the group consisting of amine terminated polyethers such as, for example, Jeffamine D-400 from Huntsman Chemical Company, amino ethyl piperazine, 2-methyl piperazine, 1,5-diamino-3-methyl-pentane, isophorone diamine, ethylene diamine, diethylene triamine, aminoethyl ethanolamine, triethylene tetraamine, triethylene pentaamine, ethanol amine, lysine in any of its stereoisomeric forms and salts thereof, hexane diamine, hydrazine and piperazine. In the practice of the present invention, the chain extender can be used as an aqueous solution.

While optional, in preparing a polyurethane polymer of the present invention use of a chain extender can be advantageous. Generally, a chain extender is employed in an amount sufficient to react with from about zero (0) to about 100 percent of the isocyanate functionality present in the prepolymer, based on one equivalent of isocyanate reacting with one equivalent of chain extender. It can be desirable to allow water to act as a chain extender and react with some or all of the isocyanate functionality present. A catalyst can optionally be used to promote the reaction between a chain extender and an isocyanate.

Catalysts are optional in the practice of the present invention. Catalysts suitable for use in the present invention include tertiary amines, and organometallic compounds, like compounds and mixtures thereof. For example, suitable catalysts include di-n-butyl tin bis(mercaptoacetic acid isooctyl ester), dimethyltin dilaurate, dibutyltin dilaurate, dibutyltin sulfide, stannous octoate, lead octoate, ferric acetylacetonate, bismuth carboxylates, triethylenediamine, N-methyl morpholine, like compounds and mixtures thereof. An amount of catalyst is advantageously employed such that a relatively rapid cure to a tack-free state can be obtained. If an organometallic catalyst is employed, such a cure can be obtained using from about 0.01 to about 0.5 parts per 100 parts of the polyurethane-forming composition, by weight. If a tertiary amine catalyst is employed, the catalyst preferably provides a suitable cure using from about 0.01 to about 3 parts of tertiary amine catalyst per 100 parts of the polyurethane-forming composition, by weight. Both an amine type catalyst and an organometallic catalyst can be employed in combination.

The present invention optionally includes a filler material. The filler material can include conventional fillers such as milled glass, calcium carbonate, aluminum trihydrate, talc, bentonite, antimony trioxide, kaolin, fly ash, or other known fillers. In the practice of the present invention, a suitable filler loading in a polyurethane dispersion can be from about 100 to about 1000 parts of filler per 100 parts of polyurethane. Preferably, filler can be loaded in an amount of at least about 200 pph, more preferably at least about 300 pph, most preferably at least about 400 pph.

The present invention optionally includes a filler wetting agent. A filler wetting agent generally can help make the filler and the polyurethane-forming composition compatible with one another. Useful wetting agents include phosphate salts such as sodium hexametaphosphate. A filler wetting agent can be included in a polyurethane-forming composition of the present invention at a concentration of at least about 0.5 parts per 100 parts of filler, by weight.

The present invention optionally includes thickeners. Thickeners can be useful in the present invention to increase the viscosity of low viscosity polyurethane dispersions. Thickeners suitable for use in the practice of the present invention can be any thickener known in the art of preparing polyurethane dispersions. For example, suitable thickeners include ALCOGUM VEP-II* (*ALCOGUM™ VEP-II is a trade designation of Alco Chemical Corporation) and PARAGUM 231* (*PARAGUM 231 is a trade designation of Para-Chem Southern, Inc.). Thickeners can be used in any amount necessary to obtain a dispersion of desired viscosity.

The present invention can include other optional components. For example, a polyurethane-forming composition of the present invention can include surfactants, blowing agents, frothing agents, fire retardant, pigments, antistatic agents, reinforcing fibers, antioxidants, preservatives, acid scavengers, and the like. Examples of suitable blowing agents include: gases and/or mixtures of gases such as, for example, air, carbon dioxide, nitrogen, argon, helium, and the like; liquids such as, for example, water, volatile halogenated alkanes such as the various chlorfluoromethanes and chlorfluoroethanes; azo-blowing agents such as azobis (formamide).

Frothing agents are typically introduced by mechanical introduction of a gas into a liquid to form a froth (mechanical frothing). Mechanical frothing of a polyurethane polymer is a procedure known and practice by those skilled in the art of preparing polyurethane polymers. In preparing a frothed polyurethane foam, it is preferred to mix all components and then blend the gas into the mixture, using equipment such as an Oakes or Firestone foamer. In the preparation of a froth for a carpet backing, it is not necessary to obtain a froth that is stable. In a carpet backing production process, a frothed foam typically is spread on the back of a carpet using a spreading tool, which destroys the froth in the process.

Surfactants are optional, but can be desirable in the practice of the present invention. Surfactants useful herein can be cationic surfactants, anionic surfactants, or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention can be either external suarfactants or internal surfactants. External surfactants are surfactants which do not chemically react with the polymer to form a covalent bond during the preparation of the dispersion. Internal surfactants are surfactants which do become chemically reacted into the polymer during dispersion preparation. A surfactant can be included in a formulation of the present invention in an amount ranging from about 0.01 to about 20 parts per 100 parts by weight of polyurethane component. Preferabley, the formualtions of the present invention include polyurethane prepolymers which are not internal surfactants.

Generally, any method known to one skilled in the art of preparing polyurethane dispersions can be used in the practice of the present invention to prepare a moisture resistant polymer of the present invention. A moisture resistant polymer of the present invention can be prepared from polyurethane dispersions that are storage-stable or polyurethane dispersions that are not storage-stable. A storage-stable polyurethane dispersion as described herein is any polyurethane dispersion having a mean particle size of less than about 5 microns. A polyurethane dispersion that is not storage-stable can have a mean particle size of greater than 5 microns. For example, a suitable dispersion can be prepared by mixing a polyurethane prepolymer with water and dispersing the prepolymer in the water using a commercial blender. Alternatively, a suitable dispersion can be prepared by feeding a prepolymer into a static mixing device along with water, and dispersing the water and prepolymer in the static mixer. Continuous methods for preparing aqueous dispersions of polyurethane are known and can be used in the practice of the present invention. For example, U.S. Pat. Nos.: 4,857,565; 4,742,095; 4,879,322; 3,437,624; 5,037,864; 5,221,710; 4,237,264; and 4,092,286 all describe continuous processes useful for obtaining polyurethane dispersions. In addition, a polyurethane dispersion having a high internal phase ratio can be prepared by a continuous process as described in U.S. Pat. No. 5,539,021, incorporated herein by reference. In addition, it can be advantageous to combine a continuous process for preparing a prepolymer with a continuous feed dispersion process in order to maximize process efficiency as discussed in pending U.S. Appl. Ser. No. 09/039978.

The polymers of the present invention can be applied to any substrate, but preferably the substrate is a textile. More preferably, the substrate is a carpet and the polymer is in the form of a moisture resistant backing. A carpet backing of the present invention can be prepared from a polyurethane dispersion of the present invention, described hereinabove, using either conventional or non-conventional methods in the art of preparing polyurethane-backed carpets. In preparing polyurethane-backed carpets of the present invention, a polyurethane-forming composition can be applied as a layer of preferably uniform thickness onto one surface of a carpet substrate. Polyurethane dispersions of the present invention can be applied as a precoat, laminate coat or as a foam coat. Polyurethane precoats, laminate coats, and foam coats can be prepared by methods known in the art. Precoats, laminate coats and foam coats prepared from dispersions are described in P. L. Fitzgerald, "Integral Latex Foam Carpet Cushioning", J. Coat. Fab. 1977, Vol. 7 (pp.107–120), and in R. P. Brentin, "Latex Coating Systems for Carpet Backing", J. Coat. Fab. 1982, Vol. 12 (pp. 82–91), for example.

A polyurethane-forming composition can be applied to one surface of a carpet substrate before it cures to a tack-free state. Alternatively, a polyurethane dispersion containing completely reacted isocyanate functionality can be applied to a suitable substrate, thereby removing the need to cure the polymer. Typically the polyurethane-forming composition is applied to the surface that is attached to a primary backing but can be applied to a secondary backing such as mesh or fleece. The composition can be applied using equipment such as a doctor knife, air knife, or extruder to apply and gauge the layer. Alternatively, the composition may be formed into a layer on a moving belt or other suitable apparatus and dehydrated and/or partially cured, then married to the carpet substrate using equipment such as a double belt (also known as double band) laminator or a moving belt with an applied foam cushion. The amount of polyurethane-forming composition used can vary widely, from about 5 to about 500 ounces per square yard, depending on the characteristics of the textile. After the layer is applied and gauged, water is removed from the dispersion and the layer can be cured using heat from any suitable heat source such as an infrared oven, a convection oven, or heating plates.

In the practice of the present invention, any of the steps used in preparing a polyurethane carpet backing can be carried out in a continuous manner. For example, in a first step the prepolymer can be prepared from a suitable active hydrogen containing compound in a continuous manner; the prepolymer can be fed, as it is obtained in the first step, into a mixing device with water to obtain an aqueous dispersion; the aqueous dispersion can be applied to a carpet substrate in a continuous manner to obtain a polyurethane backed carpet.

The following example is provided to illustrate the present invention. The example is not intended to limit the scope of the present invention and should not be so interpreted.

EXAMPLE 1

A prepolymer, hereinafter Prepolymer A, is prepared as follows:

195.7 parts (0.1957 eq.) of VORANOL 5287*, a 12.5 percent ethylene oxide capped polypropylene oxide diol with an equivalent weight of 1000 g/eq; 93.02 parts (0.7442 eq.) of ISONATE 25OP*, a mixture of 25 percent 2,4'-MDI and 75 percent 4,4'-MDI; 5.28 parts (0.02966 eq.) of EMEREST 2421* glycerol monooleate and 6.0 parts (6.316 meq) of polyethylene glycol monot (MPEG) having a molecular weight of 950 are mixed with heating to 70° C. in a glass vessel for about 15 hours. The resultant prepolymer has a percent NCO of 6.88, an isocyanate eqivalent weight of 610, and a viscosity of 6040 cps @ 25 C. (EMEREST 242 is a trade designation of the Henkel Corp; VORANOL 5287 and ISONATE 25OP is a trade designation of The Dow Chemical Company).

A polyurethane dispersion is prepared as follows:

75.58 parts of Prepolymer A; 9.9 part of a DESULF DBS-25T*, a 25 percent aqueous solution of a triethanolamine salt of dodecyl benzene sulfonic acid; and 20.08 parts of water are mixed at room temperature and then stirred at 3000 rpm in a glass flask. 44.4 parts of a 10 percent aqueous piperazine solution is added to the mixture, and stirring is continued for 1 minute at 3000 rpm. The resulting mixture is then stirred overnight with a stir bar and is filtered through a paint filter to yield a low viscosity, 55 percent solids polyurethane dispersion with a mean particle size of 0.24 microns. (*DESULF DBS-25T is a trade designation of DeForest Chemical Co.)

A carpet backed with the polyurethane dispersion is prepared as follows:

The dispersion is compounded by admixing 178.6 parts of the dispersion (100 parts solids) and 200 parts calcium carbonate filler. Then, 3.0 parts of PARAGUM 241* thickener is admixed. The compound is applied to the back of a nylon level loop style carpet with a greige weight of 23 oz/yd$^2$ (0.8 kg/M$^2$) at a coating weight of 38.5 oz/yd$^2$ (1.3 kg/m$^2$). A polypropylene scrim, 3.3 oz/yd$^2$ (0.11 kg/m$^2$), is applied as a secondary backing. The carpet is dried at 132° C. for 12 minutes, then allowed to equilibrate overnight before testing. (*PARAGUM 241 is a trade designation of Para-Chem Southern, Inc.)

The carpet is tested as follows:

The carpet of Example 1 has a tuftlock of 17.4 pounds (7.9 kg), and a rewet tuftlock of 11.2 pounds (5.1 kg). Tuftbind values are obtained according to ASTM D1335. The carpet of Example 1 has a dry delamination of 10.1 pounds/in. (1.8 kg/cm) and a re-wet delamination of 5.0 pounds/in 0.89 kg/cm). The delamination is the strength required to remove the secondary polypropylene scrim from the fabricated carpet. It is determined by cutting a 3 inch by 9 inch (7.6 cm×22.9 cm) strip of carpet, and peeling the secondary scrim from the main portion of the carpet while measuring the force required. The rewet delamination is determined in the same manner, except that the carpet specimen is soaked for one minute in water, and blotted dry prior to testing. The carpet has a hand punch of 17.7 pounds (8.0 kg). The hand punch is measured as the force required to push a 9 inch by 9 inch (22.9 cm×22.9 cm) piece of carpet 0.5 inches (1.27 cm) into a 5.5 inch (14 cm) inner diameter cylinder at a rate of 12.0 inches (30.5 cm) per minute, using a 2.25 inch (5.7 cm) outer diameter solid cylinder attached to a load cell. The carpet passes a water resistance test known as the British spill test in which 100 ml of a solution of methylene blue dye in water is poured from a height of 1 meter onto a 12×12 inch (30.5 cm×30.5 cm) piece of carpet and allowed to stand for 24 hours. The sample is inscribed with a razor knife to reveal the interior. A pass rating is given if no blue dye is found to have penetrated into or through the backing.

EXAMPLE 2

A prepolymer and dispersion are prepared as in Example 1. The procedure of Example 1 is used to compound the dispersion, except that 100 parts of calcium carbonate, 100 parts of Gamma Sperse CS-11*, and 0.6 parts of PARAGUM 241 are used to compound the dispersion. The compound is applied to the back of a carpet at a coat weight of 37.1 oz/yd$^2$ (1.26 kg/m$^2$) and the resulting carpet gave the following test results:

| | |
|---|---|
| Hand (lb.) | 13.8 (6.3 kg) |
| Tuftlock (lb.) | 19.8 (9.0 kg) |
| Rewet Tuftlock (lb.) | 13.3 (6.0 kg) |
| British Spill Test | pass |

(* Gamma Sperse CS-11 is a calcium carbonate which has been treated with ammonium stearate to provide improved hydrophobic properties and is a trade designation of Georgia Marble Co.)

COMPARATIVE EXAMPLE 3

Prepolymer B is prepared as follows:

190.85 parts (0.1908 eq.) of VORANOL 5287; 99.25 parts (0.794 eq.) of ISONATE 25OP*, a mixture of 25 percent 2,4'-MDI and 75 percent 4,4'-MDI; 3.9 parts (0.07358 eq.) of diethylene glycol; and 6.0 parts (6.316 meq) of polyethylene glycol monol (MPEG) having a molecular weight of 950 are mixed with heating to 70° C. in a glass vessel for about 15 hours. The prepolymer has a percent NCO of about 7.3, an isocyanate equivalent weight of about 575, and a viscosity of about 7000 cps @ 25 C.

(*ISONATE 25OP is a trade designation of The Dow Chemical Company).

A polyurethane dispersion is prepared as follows:

75.5 parts of Prepolymer B; 9.9 parts of a 25 percent aqueous solution of the triethanolamine salt of dodecyl benzene sulfonic acid; and 19.3 parts of water are mixed at room temperature and then stirred at 3000 rpm in a glass flask. 45.3 parts of a 10 percent aqueous piperazine solution is added to the mixture, and stirring is continued for 1 minute at 3000 rpm. The resulting mixture is stirred overnight with a stir bar and filtered through a paint filter to yield a low viscosity, 55 percent solids polyurethane dispersion with a mean particle size of 0.3 microns.

A Carpet backed with the polyurethane dispersion is prepared as follows:

The dispersion is compounded by admixing 178.6 parts dispersion (100 parts solids) with 200 parts calcium carbonate filler. 4.1 parts of PARAGUM 241 is then admixed. The compound is applied to the back of a nylon level loop style carpet with a greige weight of 23 oz/yd$^2$ (0.8 kg/m$^2$) at a coating weight of 38.5 oz/yd$^2$ (1.3 kg/m$^2$). A polypropylene scrim, 3.3 oz/yd$^2$ (0.11 kg/m$^2$), is applied as a secondary backing. The carpet is dried at 132° C. for 12 minutes, then allowed to equilibrate overnight before testing.

The carpet is tested as follows:

The carpet of Comparative Example 3 is tested substantially identically to the carpet of Example 1. It has a tuftlock of 18.5 pounds (8.4 kg), and a rewet tuftlock of 8.9 pounds (4.0 kg). The carpet of Comparative Example 3 has a dry delamination of 10.1 pounds/in. (1.8 kg/cm) and a rewet delamination of 5.0 pounds/in. (0.89 kg/cm). The carpet of Comparative Example 3 has a hand punch of 14.7 pounds (6.7 kg). The carpet failed the British spill test.

COMPARATIVE EXAMPLE 4

A prepolymer and dispersion are prepared as in Comparative Example 3. The procedure of Comparative Example 3 is used to compound the dispersion, except that 100 parts of calcium carbonate, 100 parts of GAMMA SPERSE CS-11, and 0.98 parts of PARAGUM 241 are used to compound the dispersion. The compound is applied to the back of a carpet at a coat weight of 38.5 (1.3 kg/m$^2$)oz/yd$^2$, and the resulting carpet gave the following test results:

| | |
|---|---|
| Hand (lb.) | 11.8 (5.4 kg) |
| Tuftlock (lb.) | 18.9 (8.6 kg) |
| Rewet Tuftlock (lb.) | 12.4 (5.6 kg) |
| British Spill Test | fail |

What is claimed is:

1. An aqueous polyurethane dispersion comprising polyurethane polymer particles dispersed in water wherein the polyurethane polymer particles are of an isocyanate terminated prepolymer prepared from a formulation including a polyisocyanate and a polyol mixture, wherein the polyol mixture includes at least one aliphatic mono, di or polyhydroxy compound which has an aliphatic side chain substituent which contains from 5 to 30 carbon atoms, and the aliphatic mono, di or polyhydroxy compound which has an aliphatic side chain substituent is present at a concentration of from 0.5 to 10 weight percent of the polyurethane polymer particles and said polyurethane polymer particles are dispersed with a surfactant consisting essentially of an external surfactant.

2. The aqueous polyurethane dispersion of claim 1 wherein the polyisocyanate is MDI.

3. The aqueous polyurethane dispersion of claim 1 wherein the aliphatic mono, di or polyhydroxy compound which has an aliphatic side chain substituent which contains from 5 to 30 carbon atoms is a glycol of a glycerin, trimethylolpropane, or trimethylolethane that has been partially esterified with a 5 to 22 carbon carboxylic acid.

4. The aqueous polyurethane dispersion of claim 3 wherein the glycol of a glycerin, trimethylolpropane, or trimethylolethane is selected from the group consisting of glycerol monooleate, glycerol monobebenate, glycerol monotallate, glycerol monostearate, glycerol monopalmitate, trimethylolpropane monostearate, and mixtures thereof.

5. The aqueous polyurethane dispersion of claim 1 wherein the aliphatic mono, di or polyhydroxy compound which has an aliphatic side chain substituent which contains from 5 to 30 carbon atoms is present at a concentration of from 1.0 to 4.5 weight percent of the polymer.

6. The aqueous polyurethane dispersion of claim 5 wherein the aliphatic mono, di or polyhydroxy compound which has an aliphatic side chain substituent which contains from 5 to 30 carbon atoms is present at a concentration of from 1.5 to 2.5 weight percent of the polymer.

7. The aqueous polyurethane dispersion of claim 1 wherein the aliphatic mono, di or polyhydroxy compound which has an aliphatic side chain substituent which contains from 5 to 30 carbon atoms is a glycerol monoester.

8. The aqueous polyurethane dispersion of claim 1 wherein the external surfactant is a triethanolamine salt of dodecyl benzene sulfonic acid.

9. The aqueous polyurethane dispersion of claim 1 wherein the polyol mixture includes a polyether polyol.

10. The aqueous polyurethane dispersion of claim 1 wherein the dispersion is prepared in the substantial absence of an organic solvent.

11. The aqueous polyurethane dispersion of claim 1 wherein the dispersion is compounded with a filler.

12. The aqueous polyurethane dispersion of claim 11 wherein the filler is selected from the group consisting of milled glass, calcium carbonate, aluminum trihydrate, talc, bentonite, antimony trioxide, kaolin, fly ash, and mixtures thereof.

13. The aqueous polyurethane dispersion of claim 11 wherein the filler is calcium carbonate.

14. The aqueous polyurethane dispersion of claim 12, wherein the filler is milled glass.

* * * * *